United States Patent [19]

Rossi

[11] Patent Number: 4,523,709
[45] Date of Patent: Jun. 18, 1985

[54] APPARATUS FOR ALIGNING AND SUPPORTING SIMILAR BODIES

[75] Inventor: Claudio Rossi, Wetzikon, Switzerland

[73] Assignee: Rossi AG Wetzikon, Werkzeug- Und Spezialmaschinenbau, Switzerland

[21] Appl. No.: 501,564

[22] Filed: Jun. 6, 1983

[30] Foreign Application Priority Data

Jun. 4, 1982 [CH] Switzerland .................. 3482/82

[51] Int. Cl.³ .................. B23K 37/02; B23K 37/04
[52] U.S. Cl. .................. 228/48; 228/49.3
[58] Field of Search ........... 228/47, 48, 49 R, 49 B; 269/43; 219/60 A, 59.1, 60 R

[56] References Cited

U.S. PATENT DOCUMENTS

| 2,013,630 | 9/1935 | Goldsborough | 219/60 A |
| 3,702,913 | 11/1972 | Kazluaskas et al. | 219/60 A |
| 4,025,034 | 5/1977 | Randolph et al. | 228/48 X |
| 4,139,180 | 2/1979 | Itani et al. | 228/47 X |
| 4,295,592 | 10/1981 | Schafer | 228/48 X |
| 4,432,486 | 2/1984 | Wascat | 228/49 A |

FOREIGN PATENT DOCUMENTS

| 1534257 | 11/1978 | United Kingdom | 219/60 A |
| 284225 | 4/1971 | U.S.S.R. | 219/60 A |

*Primary Examiner*—Kenneth J. Ramsey
*Assistant Examiner*—M. Jordan
*Attorney, Agent, or Firm*—Roylance, Abrams, Berdo & Goodman

[57] ABSTRACT

An apparatus for mutually aligning and rotatably supporting similarly shaped facing circumferential surfaces of at least two members, e.g., for producing a circumferential weld, has an endless belt, which can be placed and secured around the adjoining circumferential surfaces. The belt is longitudinally flexible but axially stiff. The radially acting tension of the belt aligns the members. A loop gap formed between two belt guide rollers allows welding in the tensioned state. The tension is obtained by a tension roller acting in the belt loop and a drive engaging in said belt makes it possible to rotate the members in the tensioned state.

9 Claims, 5 Drawing Figures

APPARATUS FOR ALIGNING AND SUPPORTING SIMILAR BODIES

This invention relates to an apparatus for mutually aligning and rotatably supporting similarly shaped bodies which have adjacent circumferential edges, such as a boiler end and a boiler casing, so that the edges can be joined together as by welding.

BACKGROUND OF THE INVENTION

An apparatus for supporting parts of metal barrels is shown in German OS No. 1,931,172 so that a barrel ring and a barrel bottom can be held together at three circularly spaced points by means of support and guide rollers which can be rotationally driven. Such an apparatus can only be used if the hollow members to be rotatably held in this manner are circular and have no significant undulations in diameter because, otherwise, they stick to the support and guide rollers. Further, the support at only three circumferential points permits only inadequate centering and, in particular, prevents nonmutual displacements of the parts to be welded together which might arise as a result of geometrical inaccuracies and thermal expansion. The drive for each support and guide roller is also relatively complicated. The direct rotary drive of the hollow cylindrical members to be welded together leads to the disadvantage, when using stationary centering means, that the hollow members can be rotationally or otherwise displaced relative to one another when the rotary movement is started so that defective welds can occur. When using a relatively large number of support and guide rollers, the cost of construction is high, particularly if it is necessary to form the apparatus so that it is adaptable to bodies of different diameters.

In order to achieve more accurate centering, the use of tension rings is proposed in German UM No. 1,899,244 and UM No. 6,802,044, the curvature of the tension rings being adapted to the circumference of the hollow members to be welded together. Thus, such an apparatus is only suitable for bodies having accurately predetermined dimensions, or else it requires costly and complicated reconstruction for adaption to other dimensions.

BRIEF SUMMARY OF THE INVENTION

Accordingly, an object of the present invention is to provide an improved apparatus for rotatably supporting members to be joined together such that, with limited construction costs, accurate mutual alignment of two bodies can be accomplished and the apparatus can be easily adapted to different dimensions of such bodies.

Further, an object is to provide such a apparatus in which precise alignment is still possible even in the event of geometrical inaccuracies of thin-walled, hollow cylindrical members.

Briefly described, the invention includes an apparatus for mutually aligning and rotatably supporting at least two similarly shaped bodies so that contiguous circumferentially extending edges thereof can be joined together comprising a stiff, endless belt partially encircling the bodies and axially bridging the contiguous edges, the belt extending around and engaging the bodies over a circumferential extent of significantly less than 360°, thereby leaving a gap at which the belt forms a loop extending away from the edges, the encircling portion being parallel with the rotational axis of said bodies; guide members engaging the outer surface of said belt on both sides of said gap; and a tension member engaging the inner surface of said belt in said free loop.

The apparatus, according to the invention, permits the use of a rotary drive acting directly on the bodies which are to be joined for performing a continuous welding operation without influencing the accuracy of alignment of these bodies with respect to each other, but the apparatus also permits applying driving force to the belt only so that the need for several drives is eliminated.

Advantageously, the endless belt employed is a link belt or a chain because such a body can be made rigid in a direction parallel to the rotation axis of the bodies being joined without losing the easy flexibility of a belt.

To permit easy insertion into the apparatus of the members which are to be mutually aligned, grippers constructed with holding magnets are advantageously provided around the encircling portion of the belt to hold the belt away from the bodies in the relaxed state.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF PREFERRED EMBODIMENTS

Figures 1, 2:
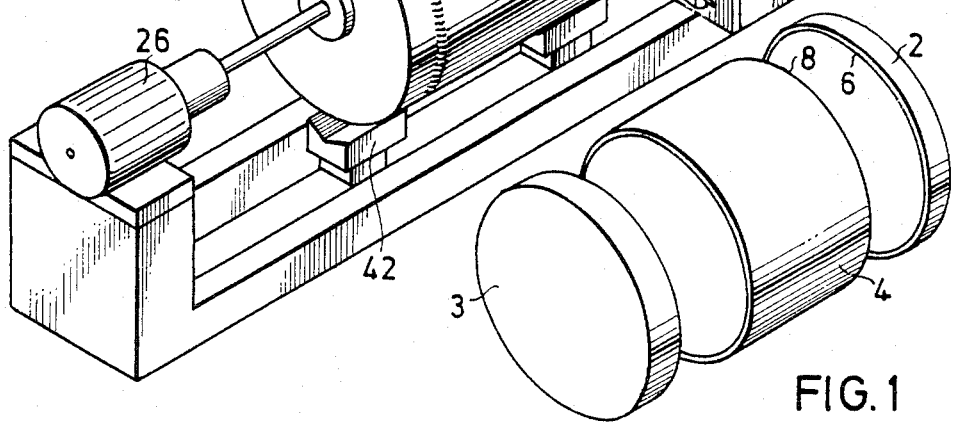
FIG. 1 is a perspective exploded view of thin-walled, hollow members of the type which can be handled, aligned and rotated by an apparatus in accordance with the invention.
FIG. 2 is a perspective schematic view of an apparatus in accordance with the invention with parts of cylindrical hollow bodies held therein.

The apparatus in accordance with the invention can be used to particular advantageous for holding together and centering relatively thin-walled, circular cylindrical hollow members such as those shown in FIG. 1 which can be boiler ends 2 and 3 which are to be joined to a boiler casing 4 so that the facing edges 6 and 8 can be joined together by a circumferential weld. For this purpose, the hollow cylindrical boiler casing 4 is placed in the apparatus as illustrated in FIG. 2 with a boiler end 2 or 3 in such a way that an endless belt 10, which is preferably constructed as a relatively wide chain, bridges the junction between the edges 6, 8 such that the circumferential junction line lies substantially in the center of the width of the belt. As will be recognized from the following description, a radial clamping force applied by belt 10 consequently acts uniformly in the vicinity of the facing, contiguous, abutting edges 6, 8 which are to be welded together and compensates for geometrical inaccuracies or variations from the precise circular shape. In addition, radial displacement of the cylindrical wall of the boiler casing 4 and the boiler ends 2, 3 relative to one another is prevented.

Figures 5A, 5B:
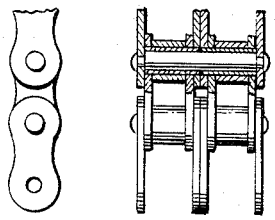
FIGS. 5A and 5B are side and front elevations of a chain usable in the apparatus of FIGS. 1–4.

Belt 10 is preferably constructed as a multiple roller chain (DIN 8180), such as those which are conventionally used, for example, as chain drives a portion of such a chain being shown in FIGS. 5A and 5B. A multiple roller chain has a plurality of sleeves juxtaposed on a common bolt which extends at right angles to the longitudinal dimension of the chain and has interposed cover plates so that there is adequate width for covering the circumferential joint.

Belt 10 partially encircles the two circumferential surfaces of the axially abutting members 2, 4 except for a relatively narrow gap 12 in which is disposed a welding electrode 13 for producing the weld 14. This gap, which will be referred to as a looping gap, results from the guidance of belt 10 around two circularly spaced rollers 16, 18 which are mounted in a stationary fashion and which can be constructed as sprockets when belt 10 is formed as a chain. These guide members engage the outer surface of the belt on both sides of the gap and permit the formation of a belt loop 20 which is guided around a tension roller 22 attached to a hydraulic tension device 24. Roller 22 engages the inside surface of the belt and directs a tension force outwardly, subjecting belt 10 to a tensile stress by which it engages firmly about the encircled portion of cylindrical members 2, 4. The cylindrical members can be directly rotatably driven by rotary drives 26 and 27, but it is also possible to drive the belt directly by a driving pulley or pinion 28 of a rotary drive 30 which acts on belt 10 in the belt loop 20. In addition, belt guide rollers 32, 33 can be provided to engage the outside of the belt for assisting with the tension and drive functions.

All of the rollers thus described which engage the belt and also the associated drives 24, 30 are mounted on a means for supporting which is illustrated as comprising a plate 34 which can be stationary or which can be movable along a guide such as that schematically illustrated at 36 so as to be adjustable in the axial direction by means of a control device 38, as illustrated by arrows 40. In suitable circumstances, it is adequate to provide axial displacement of members 2, 3 and 4 on a guide system 42 in order to be able to introduce into the encircling portion of the endless belt the members 2, 4 to be joined until the joint region defined by edges 6, 8 is encircled by the belt. The embodiment of providing the movement by supports 42 is advantageous if only one belt 10 is to be provided at one end of the apparatus, as illustrated. However, if a duplicate belt assembly is to be provided at the opposite end for concurrent formation of welds at both end of the apparatus, the embodiment of providing axial adjustment of plate 34 and its counterpart plate at the opposite end is advantageous.

Figure 3:
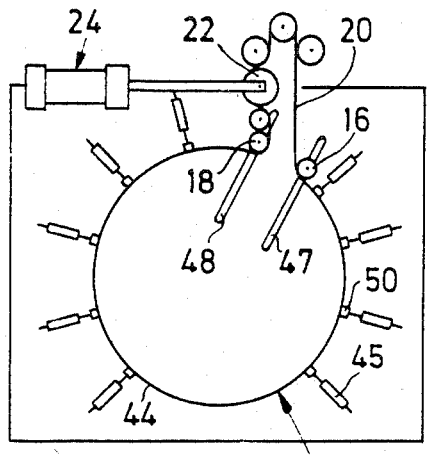
FIG. 3 is a schematic end view of a portion of the apparatus in accordance with the invention with the encircling portion of the belt held by gripper means.
Figure 4:
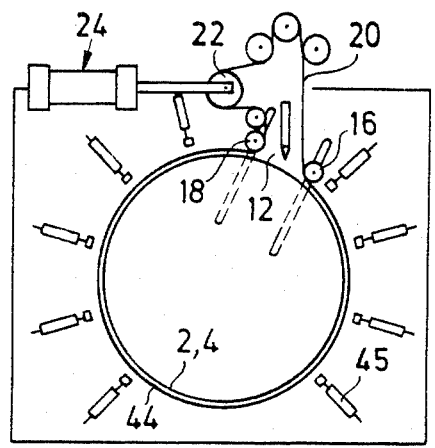
FIG. 4 is a view corresponding to FIG. 3 with the belt tensioned to engage bodies to be joined.

It will be recognized that in order to insert the workpiece 2, 4 into the belt, or to move the belt to encircle the workpiece, it is necessary to enlarge the encircling portion of the belt which will be referred to as a reception loop 44, schematically illustrated in FIG. 3. The enlargement of reception loop 44 is accomplished by a plurality of circumferentially spaced and radially adjustable gripper means 45 which can engage and radially pull the belt. In the lower area of the reception loop, the gravitational forces are sufficient to permit the belt to sag in an arcuate fashion. Guide rollers 16, 18 can be made adjustable in an approximately radial manner along guides or slots 47, 48 for the purpose of permitting enlargement of the loop and also for adapting two members 2, 3, 4 of different diameters. This adjustment can take place by means of a conventional adjustment drive such as a threaded spindle, not shown, while grippers 45 can be moved, for example, by conventional pneumatic drives. The grippers advantageously include electromagnetic holding magnets 50 when the belt 10 is made of steel or other ferromagnetic material, or if a steel chain is used. After the bodies 2, 4 have been inserted into the reception loop 44, the electromagnets can be deenergized and the belt can be tensioned by activating drive 24 to exert an outward force on tension roller 22 so that roller 22 moves from the position shown in FIG. 3 to the position shown in FIG. 4 wherein the reception loop is detached from grippers 45.

It will be recognized that the belt must be sufficiently wide in the axial direction to enclose or bridge more than two members in the encircling reception loop if, for example, a separate ring is to be coaxially held between the two cylindrical members.

It will also be recognized that tension roller 22 engaging in the belt loop 20 can also be fixedly mounted and at least one of the guide members 16, 18 can be mounted for circular movement to produce the belt tension.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for mutually aligning and rotatably supporting at least two similarly shaped bodies for welding contiguous circumferentially extending edges of the bodies, comprising:
    an axially stiff, endless belt for partially encircling and bridging the contiguous edges, said belt having a body engaging section for extending around and engaging the bodies over an arc of less than 360° and having a loop section, said body engaging section having ends defining said arc and a gap on opposite sides of said ends, said loop section extending radially away from said body engaging section at said ends, said body engaging section being parallel to a rotational axis of the bodies;
    guide members engaging outer surfaces of said belt at said ends;
    a tension member engaging an inner surface of said belt in said loop section; and
    welding means, located in said gap and radially and axially within said belt, for welding the contiguous edges of the bodies in said gap.

2. An apparatus according to claim 1 wherein said belt is a link belt.

3. An apparatus according to claim 2 wherein said link belt is a roller belt comprising a plurality of sections each having at least two juxtaposed rollers on a common bolt extending perpendicular to the longitudinal dimension of said belt and an interposed cover plate extending in the longitudinal direction of said belt.

4. An apparatus according to claim 1 wherein said arc is about 340°.

5. An apparatus according to claim 1 wherein drive means is coupled to said belt in said loop section for rotating the bodies by rotating said belt.

6. An apparatus according to claim 1 wherein said belt, said guide members and said tension member are adjustably mounted on a support for axial adjustment.

7. An apparatus according to claim 1 wherein a plurality of gripper means are circumferentially arranged radially outside of said body engaging section of said belt, said gripper means engaging and radially outwardly pulling said belt to facilitate insertion and removal of the bodies.

8. An apparatus according to claim 7 wherein each of said gripper means includes an electromagnet.

9. An apparatus according to claim 1 wherein mounting means adjustably supports said guide members to vary the size of said body engaging section for bodies of different diameters.

* * * * *